United States Patent [19]

Vroomans

[11] Patent Number: 5,180,788
[45] Date of Patent: Jan. 19, 1993

[54] GRAFT-MODIFIED LINEAR LOW-DENSITY POLYETHYLENES, PROCESS FOR THEIR PREPARATION AND THE APPLICATION THEREOF

[75] Inventor: Hubertus J. Vroomans, Beek (L.), Netherlands

[73] Assignee: Stamicarbon B.V., Geleen, Netherlands

[21] Appl. No.: 651,987

[22] Filed: Feb. 7, 1991

Related U.S. Application Data

[60] Division of Ser. No. 418,754, Oct. 5, 1989, Pat. No. 5,021,510, which is a continuation of Ser. No. 177,649, Apr. 5, 1988, abandoned.

[30] Foreign Application Priority Data

Apr. 11, 1987 [EP] European Pat. Off. ........ 87200680.4

[51] Int. Cl.$^5$ .................... C08F 255/04; C08F 255/06
[52] U.S. Cl. ..................................... 525/285; 525/301; 525/308; 525/310; 525/322; 525/324; 524/543; 428/476.1; 428/476.3; 428/626
[58] Field of Search ............... 525/285, 322, 324, 310, 525/308, 301; 524/543; 428/476.1, 476.3, 626

[56] References Cited

U.S. PATENT DOCUMENTS

| | | | |
|---|---|---|---|
| 4,751,270 | 6/1988 | Urawa et al. | 525/285 |
| 4,753,997 | 6/1988 | Shyu et al. | 525/285 |
| 4,762,882 | 8/1988 | Okano et al. | 525/285 |
| 4,908,411 | 3/1990 | Kinoshita et al. | 525/285 |
| 4,929,682 | 5/1990 | Banzi et al. | 525/285 |

FOREIGN PATENT DOCUMENTS

| | | | |
|---|---|---|---|
| 0280454 | 8/1988 | European Pat. Off. | 525/285 |
| 2434668 | 4/1975 | Fed. Rep. of Germany | 525/285 |
| 6100813 | 8/1981 | Japan | 525/285 |
| 0168908 | 10/1982 | Japan | 525/285 |
| 0034809 | 3/1983 | Japan | 525/285 |
| 0118809 | 7/1983 | Japan | 525/285 |
| 0187406 | 11/1983 | Japan | 525/285 |
| 0196209 | 11/1983 | Japan | 525/285 |
| 0068319 | 4/1984 | Japan | 525/285 |
| 62-013419 | 1/1987 | Japan | 525/285 |

*Primary Examiner*—James J. Seidleck
*Assistant Examiner*—Vasu S. Jagannathan
*Attorney, Agent, or Firm*—Cushman, Darby & Cushman

[57] ABSTRACT

The invention relates to graft-modified linear polyethylene with low density (<940 kg/dm$^3$) (LLDPE), and in particular with very low density (density <915 kg/dm$^3$) (VLDPE), grafted particularly with styrene/maleic anhydride.

These polyethylenes are very good impact modifiers with a high UV resistance and a high degree of toughness and do not cause discoloration of the polyamides and polyesters modified with them. They can be prepared in a simple and economically efficient manner with a high degree of conversion.

These polyethylenes are also highly suited as impact modifiers, adhesives or adhesive layers, heat-seal layers, bonding layers in composite films, compatibility enhancement agents as well as bonding promotors, or as components of such agents or layers.

Graft-modified polyethylene can be prepared by converting a linear low-density polyethylene with the grafting material at at temperature higher than 110° C. under the influence of shearing forces using radical catalysts and optionally anti-oxidants, in which process the grafting material may be used in the presence of a solvent.

6 Claims, 1 Drawing Sheet

GRAFT-MODIFIED LINEAR LOW-DENSITY POLYETHYLENES, PROCESS FOR THEIR PREPARATION AND THE APPLICATION THEREOF

This is a division of U.S. Pat. No. 5,021,510, filed Oct. 5, 1989 which is a continuation of application Ser. No. 07/177,649, filed Apr. 5, 1988, now abandoned.

The invention relates to novel graft-modified linear polyethylenes having a density lower than 940 kg/m$^3$, further to a process for the preparation thereof and to the application of these polyethylenes.

From DE-A-2 108 749 polymers are known containing free carboxyl groups, particularly linear high-density polyethylenes (d>940 kg/m$^3$, HDPE) and branched low-density polyethylenes (d<940 kg/m$^3$, LDPE). These polymers are not suited as impact modifiers for polymers, c.q. polyesters and polyamides.

The impact modifiers for polymers known in the art, such as polyethylene modified with acrylic acid, EPDM rubber modified with maleic anhydride, copolymers from acrylic acid and acrylic acid esters and ethylene and terpolymers from ethylene, acrylic acid esters and maleic anhydride, have the disadvantage that they cause discolouration of the polyamide and polyester, that their preparation is expensive, with relatively low conversions, and that, as impact-modifiers, they can yet be improved upon.

Graft-modified polybutadiene has the disadvantage that its UV-resistance is insufficient, while polymers based on acrylate (for instance methylmethacrylate polymer) will be brittle already at relatively high temperatures.

The object of the invention is to provide novel compounds combining the advantages and applicability of the polymers known from DE-A-2 108 749 with the possibility of being used as impact modifiers for thermoplastic polymers without the above-mentioned disadvantages and having a good UV-resistance as well as a high degree of toughness, also at low temperatures.

This object can be achieved with linear polyethylenes with a density lower than 940 kg/m$^3$ (LLDPE) grafted with one or more compounds containing carboxyl groups and one or more vinylaromatic compounds.

The invention is based on the fact that graft-modified linear low-density polyethylenes surprisingly have very favourable properties and are very good impact modifiers for, for instance, polyamide, polycarbonate, polyacetals, vinylaromatic polymers and polyesters and also have a very high UV-resistance and a high degree of toughness without causing discolouration, while they are, moreover, perfectly suited as adhesives or adhesive layers, as bonding layers in composite films, as heat-seal layers, as compatibility enhancement agents for polar and non-polar plastics, which may be filled with mineral fillers, while besides they are suited also for use in mixtures with other polymers, particularly polyolefin homopolymers and copolymers (such as, for instance, polypropylene, EPDM rubber, various polyethylenes, etc.). Also, in order to obtain the properties required at a particular moment, they can be prepared to meet certain specifications in a simple manner.

The graft-modified linear low-density polyethylenes according to the invention are preferably grafted with the customary grafting materials for polyethylenes containing carboxyl groups such as, for instance, acrylic acid, methacrylic acid, maleic acid, fumaric acid, itaconic acid, citraconic acid, crotonic acid, endo-cis-bicyclo-(2,2,1)hepto-5-en-2,3-dicarboxylic acid and bicyclo(2,2,1)hepto-2-en-5-,6-dicarboxylic acid, the derivatives of these acids, such as their acid halides, amides, imides, anhydrides, esters and salts. Examples of these derivatives are malenyl chloride, maleimide, acrylamide, methacrylamide, glycidyl methacrylate, maleic anhydride, itaconic anhydride, citraconic anhydride, bicyclo(2,2,1)hepto-2-en-5,6-dicarboxylic anhydride, monomethyl maleate, dimethyl maleate, glycidyl maleate, dimethyl fumarate, diethyl itaconate, dimethyl citraconate, dimethylbicyclo(2,2,1)hepto-2-en-5-,6-dicarboxylate, methyl acrylate, methyl methacrylate, glycidyl acrylate, sodium acrylate, sodium methacrylate, potassium methacrylate, disodium maleate, dipotassium maleate, monosodium maleate, disodium fumarate, dilithium itaconate, diammonium citraconate, disodiumbicyclo(2,2,1)hepto-2-en-5,6-dicarboxylate, 4-methylcyclohex-4-en-1,2-dicarboxylic anhydride, 1,2,3,4,5,8,9,10-octahydronaphthalene-2,3-dicarboxylic anhydride, bicyclo(2,2,2)oct-7-en-2,3,5,6-tetracarboxylic acid-2,3,5,6-dianhydride, bicyclo(2,2,1)hept-5-en-2,3-dicarboxylic anhydride, methylbicyclo(2,2,1)hept-5-en-2,3-dicarboxylic acid, as well as 7-oxabicyclo(2,2,1)hept-5-en-2,3-dicarboxylic anhydride. Mixtures of these substances can be used also.

The vinylaromatic compound(s) used for grafting linear low-density polyethylenes, are for instance styrene, substituted styrenes, such as R-styrene, where R is an alkyl group with 1 to 10 carbon atoms. Mixtures of vinylaromatic monomers can be used also.

The molar ratio of the vinylaromatic monomer(s) to the compound(s) containing carboxyl groups will be, for instance, 5:1 to 1:5, and particularly from 2:1 to 1:2.

Particularly linear low-density polyethylenes grafted with a mixture of styrene and maleic anhydride, for instance in a molar ratio of 5:1 to 1:5 and specifically of 2:1 to 1:2, have turned out to be particularly advantageous impact modifiers for thermoplastic polymers.

Excellent results are achieved when using graft polyethylenes with a very low density (density <915 kg/m$^3$) (VLDPE) and particularly with a density <910 kg/m$^3$, especially <900 kg/m$^3$. The density is generally not lower than 870 kg/m$^3$, particularly not lower than 880 kg/m$^3$. The linear polyethylenes suitable for grafting are, for instance, copolymers of ethylene and of one or more $\alpha$-olefins with 3 to 8 carbon atoms, particularly with 5 to 12 carbon atoms. Ethylene terpolymers (such as, for instance, propylene or butylene and $\alpha$-olefins with 5–12 carbon atoms) may be used also. Moreover, larger or smaller amounts of poly-unsaturated compounds, such as dienes (for instance 1,9-decadiene), may be present also. The highest melting point as measured with the Differential Scanning Calorimetry, is between 100° C. and 130° C., and the crystallinity at 23° C., also determined by the DSC-method, is at least 10%, preferably at least 20%.

It is an advantage also to graft mixtures of these linear polyethylenes or mixtures with other polyolefins such as, for instance, polypropylene, ethylene/propylene copolymers, ethylene/propylene terpolymers, other polyethylenes, polybutadiene or mixtures thereof, etc. At least 5% (wt), particularly 10% (wt) and with particular advantage 30% (wt) of the mixture should, however, consist of a linear low-density polyethylene.

The linear low-density polyethylenes (LLDPE) and very low-density polyethylenes (VLDPE) that may be considered according to the invention can be prepared using processes known in the art, such as for instance processes using transition metal compounds as catalysts, particularly Ziegler-Natta catalysts (cf. for instance GB-A-1 235 062). Preferably, in addition to the titanium compound, a vanadium compound is present also, as well as a halogen compound, particularly an organic halogen compound. Preference is given to using a catalyst containing one or more titanium, vanadium, organoaluminum, organic halogen and optionally one or more organomagnesium compounds. The polymers may contain the customary additives, such as stabilizers, lubricants, etc.

For the objects according to the invention a grafting degree of 0.2 to 20% (wt) of compound(s) containing carboxyl groups, calculated on the polyethylene has proved to be favourable, while particularly grafting degrees ranging from 0.5 to 15% (wt) and with particular preference from 1 to 10% (wt) may be considered.

A process for grafting styrene/maleic anhydride on polymers with active or unstable hydrogen atoms, such as polyethylene, is described in DE-A-2 108 749. Using polyethylene, this process consists in the conversion, at a temperature higher than about 120° C., of a mixture of styrene and maleic anhydride with the polyethylene.

For the preparation of the polyethylenes according to the invention this process, in which the use of solvents and radical catalysts to accelerate the reaction is preferably avoided, can be applied. It has been found, however, that the use of a solvent, particularly a polar solvent, such as a ketone, for instance acetone, and/or the use of radical initiators, such as peroxides and azo compounds, cause the grafting speed as well as the degree of grafting and the degree of conversion to increase.

A high shearing effect, resulting in an intimate contact of the material to be grafted, is also important in this connection.

The invention therefore also relates to a process for the preparation of graft-modified low-density polyethylenes by converting the polyethylenes with one or more carboxyl group containing compounds and one or more vinylaromatic compounds at a temperature higher than 110° C. under the influence of shearing forces in the presence of a solvent and/or a radical catalyst and optionally an anti-oxidant.

According to the invention, while using styrene/maleic anhydride in conformity with the preferred mode of realization, particularly in a molar ratio of 5:1 to 1:5, preferably of 2:1 to 1:2, the suitable low-density polyethylenes are appropriately so grafted that the grafting reaction is carried out at a temperature ranging from 110° to 200° C. in a device exercising a strong shearing effect for the intimate mixture of the reactants, in which process are used a solvent such as acetone, in a weight ratio of 5:1 to 1:20, particularly 2:1 to 1:10, calculated on the total graft material, and a radical initiator chosen from organic peroxides such as dialkyl peroxides, diaryl peroxides, diacyl peroxides, organic peracids, organic peracid esters, alkyl hydroperoxides, aralkyl peroxides, or azo compounds, preferably in an amount of 0.01 to 0.5% (wt) calculated on the polyethylene. The residence time in the reaction device is then preferably 1 to 15 minutes. Before the mixture leaves the reaction device, the solvent and any available monomers can be removed in the usual manner, for instance in a degasser, upon which the graft-modified polyethylene can be granulated or be upgraded otherwise. To prevent crosslinking, an antioxidant may appropriately be added to it, for instance a phenolic or thiophenolic anti-oxidant, such as Irganox 1076 ®, Irganox 1010 ® or di-ter.-butyl-p-cresol. These antioxidants do not affect the grafting, but do prevent any undesired crosslinking.

The reaction devices in which, with a strong shearing effect, the polyethylenes applied can be grafted with the carboxyl group containing compound(s) and the vinylaromatic compound(s) may, for instance, consist of Brabender kneaders and single or twin-screw extruders, which may be followed by one or more static mixers to increase the residence time. The polyethylene is then appropriately fed to such a device and melted therein, upon which a solution of the graft compounds, which may contain a radical initiator and/or an antioxidant, is supplied to a place where melted polyethylene is available to be processed and is intimately mixed with the melt under strong shearing forces for carrying out the grafting reaction. Preferably, the vinylaromatic compound(s) is/are grafted onto the polyethylene before or together with the carboxyl group containing compound(s).

The graft-modified polyethylenes according to the invention, which appropriately have melt indices of 0.01 to 50 g/10', measured according to ASTM D-1238-E, can be used as impact modifiers, for, for instance, polycarbonates, polyacetals, vinyl aromatic polymers, polyamides and polyesters in amounts of 10 to 90, preferably 20 to 80% (wt). They can be mixed with the respective polymers in extruders in a manner known per se. The particle size of the graft polymers is preferably small, i.e. <0.5 μm, particularly <0.1 μm, and >0.001 μm, particularly >0.005 μm.

Polycarbonates are known in the art and can be prepared by the conversion of dihydroxy or polyhydroxy compounds with phosgene or diesters of carboxylic acids. Dihydroxy compounds that are particularly suited are dihydroxydiarylalkanes, for instance those that have alkyl groups or chlorine or bromine atoms at the ortho position in respect of the hydroxyl group.

The following compounds are preferred dihydroxydiarylalkanes: 4,4'-dihydroxy-2,2-diphenylpropane (bisphenol A), tetramethylbisphenol A, tetrachlorobishphenol A, tetrabromobisphenol A, as well as bis(4-hydroxyphenol)-p-diisopropylbenzol. In addition to the polycarbonates, which can be prepared from dihydroxydiarylalkanes alone, branched polycarbonates can be used. For the preparation of polycarbonates of this kind a part of the dihydroxy compound can be replaced by a polyhydroxy compound.

The polyacetals are crystalline thermoplastic resins. Examples of these polyacetals are formaldehyde homopolymers and copolymers of trioxan (i.e. of the trimer of formaldehyde) and a small amount of cyclic ether, such as ethylene oxide and 1,3-dioxane. These polyacetals can be used separately or in a mixed state.

The vinylaromatic polymers are homopolymers and copolymers of vinylaromatic monomers, such as styrene, substituted styrenes, such as α-methylstyrene, while butadiene (SBR), acrylonitrile (SAN), maleic anhydride (SMA), butadiene/acrylonitrile (ABS), etc. may be used as comonomers.

The polyamides are obtained by polycondensation of aliphatic, alicyclic and aromatic diamines, such as hexamethylene diamine, decamethylene diamine, dodecamethyl diamine, 2,2,4- or 2,4,4-trimethylhexamethylene diamine, 1,3- or 1,4-bis(aminomethyl)-cyclohexane, bis(p-amino-cyclohexyl)methane, as well as m- or p-xylol diamine with aliphatic, alicyclic and aromatic dicarboxylic acids, such as adipic acid, suberic acid, sebacic acid, cyclohexanedicarboxylic acid, terephthalic acid and isophthalic acid, as well as by condensation of lactams, such as ε-caprolactam and ω-laurolactam, copolyamides of the above-mentioned substances being eligible as well. These polyamides can be used separately or in a mixed state.

Typical examples of the above polyamides are nylon 6, nylon 4,6, nylon 6,6, nylon 610, nylon 9, nylon 11, nylon 12, nylon 6/66, nylon 66/610, as well as nylon 6/11.

The polyesters are crystalline thermoplastic resins formed from units of dihydroxy compounds based on at least one compound chosen from the group consisting of aliphatic glycols, such as ethylene glycol, propylene glycol, 1,4-butandediol, neopentyl glycol and hexamethylene glycol, alicyclic glycols, such as cyclohexanedimethanol, and aromatic dihydroxy compounds, such as bisphenol, with at least one dicarboxylic acid chosen from the group consisting of aromatic dicarboxylic acids, such as terephthalic acid, isophthalic acid and 2,6-naphthalenedicarboxy-lic acid, aliphatic dicarboxylic acids, such as oxalic acid, succinic acid, adipic acid, sebacic acid and undecadicarboxylic acid, as well as alicyclic dicarboxylic acids, such as tetrahydroterphthalic acid. These polyesters can be modified with a small amount of trihydroxy or polyhydroxy compounds and polycarboxylic acids, such as triols and tricarboxylic acids, in so far as the modified resins are thermoplastic. These polyesters can be applied by themselves or in a mixed state.

Typical examples of the above-mentioned polyesters are polyethylene terephthalate, polypropylene terephthalate, polybutylene terephthalate, as well as polyethylene isophthalate-terephthalate copolymers.

The principal object of the graft-modified linear low-density polyethylene according to the invention consists in its use as an impact modifier for polymers. In addition they can, however, also be processed according to customary methods to form moulded articles, such as films, tubes, fibres or the like, for instance by melt extrusion, it being advantageous to use the same extruder in which the grafting took place. The films produced may be single-layer or multilayer films.

The graft-modified linear low-density polyethylenes according to the invention can further be used as adhesives or adhesive layers or as bonding layers between layers of other materials, such as other polymers (such as polyolefins), metals, paper, etc., that is, they can be used for the production of multi-layer composites, for instance for the bonding of polymer with polymer, polymer with metal, as well as glass, woven or non-woven fabrics or mats, paper or the like.

They can further be used as heat-seal layers on substrates, such as other polymers, particularly polyolefins, such as polyethylenes or polypropylenes or the like. If the graft-modified linear low-density polyethylenes are used as film layer, it is in most cases not necessary to subject the surfaces of polymer film to which the graft-modified polyethylene according to the invention will be applied, to electric discharge or flame treatment, or to be provided with an adhesive coating, for the improvement of their adhesive power.

The polyethylenes according to the invention can also be processed into foamed products, using customary foaming agents.

The graft-modified linear polyethylenes according to the invention can, moreover, be processed into fibres by, for instance, melt spinning or film slitting processes, which fibres can subsequently be processed to form woven or non-woven fabrics. Woven as well as non-woven fabrics can be printed with the usual paper or textile coating and printing compounds.

The graft-modified linear low-density polyethylenes according to the invention are also particularly suited as agents for enhancing the compatibility of materials which are in themselves incompatible or which show poor compatibility. It is possible, for instance, for polyolefins like polyethylene, polypropylene, etc., to be mixed with glass if the polyolefins contain at least 5% (wt), and particularly at least 10% (wt), of the polyethylene according to the invention. Further, it is possible also to mix polar and non-polar polymers while adding the polyethylene according to the invention in an amount of at least 5% (wt), and preferably at least 10% (wt) calculated on the total polymer mixture.

The graft-modified linear low-density polyethylenes according to the invention can also be used as components of mixtures or blends in amounts of 5 to 95% (wt) calculated on the mixture, and advantageously in an amount of 10 to 90% (wt) particularly 15 to 85% (wt) calculated on the mixture. The other components of such mixtures may be plastics, such as polyolefins (ethylene and propylene homopolymers and copolymers), vinylaromatic homopolymers and copolymers, possibly with, for instance, monomers containing carboxyl groups, etc., as well as other graft polymers. The other components may also consist of materials other than polymers, for instance of glass, talcum, carbon black, metal, wood, paper, etc.

The invention is further elucidated by the following examples.

EXAMPLE 1

For the purpose of realizing this example a branched LDPE, produced in a high pressure, radical-initiated process, (d=918 kg/m$^3$; melt index (MI)=8 dg/min) is used.

This polyethylene is grafted with a 2:2:1 mixture of styrene, maleic anhydride and aceton in a Schwabenthan single-screw extruder with three static Kennics mixers connected at the outlet side.

The polyethylene is fed into the extruder, which is kept at a temperature of 150° C. and the screw speed of which is 150 rpm. At the place where the polyethylene is molten a 2:2:1 mixture of styrene (S), maleic anhydride (MA) and aceton (Ac) is supplied to the extruder. As the polyethylene and the S/MA/Ac mixture pass through the extruder and through the static mixers, which are kept at a temperature of 150° C. styrene/maleic anhydride are grafted onto the polyethylene. The residence time was about 11 minutes.

The amounts of polyethylene (PE) passed through, the amounts of S/MA/Ac supplied, the amounts of peroxide initiator and stabilizer used, which were previously mixed with the granular polyethylene (PE) fed to the extruder, the amounts of MA supplied, expressed in percentages by weight of the PE, (the corresponding amounts of styrene are, accordingly, also used, the amounts of bonded styrene are likewise not mentioned), the conversions and the melt indices of the resulting graft products are shown in table 1 below.

TABLE 1

| Exp. no. | throughput g/min | S/MA/Ac (2:2:1) ml/min | MA wt. % | peroxide wt. % | stabilizer, Irganox 1076 wt. % | bonded MA wt. % | conversion % | MI g/10' | peroxide grade |
| --- | --- | --- | --- | --- | --- | --- | --- | --- | --- |
| 1 | 29 | 8 | 5 | 0.05 | — | 3.0 | 60 | 3.0 | TRIG.C |
| 2 | 62 | 6 | 4 | — | 0.1 | 0.7 | 18 | 6.1 | — |
| 3 | 62 | 6 | 4 | 0.05 | 0.1 | 2.7 | 67.5 | 3.6 | TRIG.C |
| 4 | 56 | 6 | 4.3 | 0.1 | 0.1 | 2.5 | 58 | 2.8 | TRIG.C |
| 5 | 48 | 6 | 5 | 0.15 | 0.1 | 2.6 | 52 | 2.1 | TRIG.C |
| 6 | 52 | 6 | 4.6 | 0.05 | 0.1 | 2.0 | 40 | — | LUPr130 |
| 7 | 58 | 6 | 4.1 | — | 0.1 | 0.1 | — | 7.7 | — |
| 8 | 56 | 6 | 4.2 | 0.05 | 0.1 | 3.0 | 71 | 3.5 | TRIG.C |
| 9 | 52 | 6 | 4.6 | 0.1 | 0.1 | 2.4 | 52 | 2.8 | TRIG.C |
| 10 | 54 | 6 | 4.4 | 0.15 | 0.1 | 2.3 | 52 | 2.3 | TRIG.C |

TRIG.C = Trigonox C ®;
LUPr130 = Luperox 130 ®.

EXAMPLE 2

Example 1 is repeated, except that in experiments 1 and 2 a VLDPE (d=902 kg/m$^3$, MI=2.2 dg/min) and in experiments 3 and 20 a VLDPE (d=900 kg/m$^3$, MI=2.2 dg/min) is used. The peroxide used is Trigonox C ®.

The particulars of these experiments and the results are shown in table 2 below.

TABLE 2

| Exp. no. | throughput g/min | S/MA/Ac (2:2:1) ml/min | MA wt. % | peroxide wt. % | stabilizer, Irganox 1076 wt. % | bonded MA wt. % | conversion % | MI dg/min |
| --- | --- | --- | --- | --- | --- | --- | --- | --- |
| 1 | 37 | 4.4 | 4.8 | 0.15 | — | 1.6 | 33 | 0.06 |
| 2 | 38 | 4.4 | 4.6 | 0.15 | — | 1.7 | 22 | 0.04 |
| 3 | 40 | 4.8 | 4.8 | 0.15 | — | 1.7 | 35 | 0.04 |
| 4 | 32 | 3.3 | 4 | 0.05 | 0.05 | 1.2 | 30 | 0.06 |
| 5 | 40 | 4 | 4 | 0.05 | 0.1 | 1.6 | 36 | 0.7 |
| 6 | 41 | 4.5 | 4.3 | 0.05 | 0.1 | 1.4 | 33 | 0.6 |
| 7 | 43 | 4.5 | 4.2 | 0.05 | 0.15 | 1.4 | 34 | 0.6 |
| 8 | 45 | 4.5 | 4 | 0.05 | 0.2 | 1.0 | 25 | 0.5 |
| 9 | 40 | 4 | 4 | 0.1 | 0.2 | 1.3 | 33 | 0.2 |
| 10 | 36 | 3.5 | 4 | 0.05 | 0.05 | 1.0 | 25 | 0.5 |
| 11 | 33 | 3.5 | 4.2 | 0.1 | 0.05 | 1.6 | 38 | 0.2 |
| 12 | 31 | 3 | 4 | 0.15 | 0.05 | 1.5 | 38 | 0.1 |
| 13 | 39 | 4 | 4 | 0.05 | 0.1 | 0.8 | 20 | 0.1 |
| 14 | 38 | 4 | 4.1 | 0.1 | 0.1 | 1.3 | 32.5 | 0.4 |
| 15 | 40 | 4 | 4 | 0.15 | 0.1 | 1.7 | 42 | 0.2 |
| 16 | 45 | 4.5 | 4 | 0.05 | 0.15 | 1.3 | 29 | 0.9 |
| 17 | 45 | 4.5 | 4 | 0.1 | 0.15 | 1.4 | 35 | 0.3 |
| 18 | 41 | 4 | 4 | 0.15 | 0.15 | 1.8 | 38 | 0.1 |
| 19 | 45 | 4.5 | 4 | 0.05 | 0.2 | 1.6 | 40 | 0.9 |
| 20 | 43 | 4.5 | 4 | 0.1 | 0.2 | 1.4 | 35 | 0.4 |

EXAMPLE 3

The polyethylene used is a LDPE (d=918 kg/m$^3$; MI=8 dg/min). The grafting reaction takes place in a twin-screw extruder (WPZSK 42 D) at the temperatures mentioned in table 3 below. In experiments 1 to 7 the PE is mixed with the MA before being fed to the extruder, whereas, in an amount of 5% calculated on the PE, the styrene is injected into the extruder.

In experiments 8 to 14 a mixture of styrene, maleic anhydride and aceton (2:2:1, weight ratio) is fed into the extruder. Trigonox C ® in used as peroxide catalyst.

In table 3 below the conditions of the experiments, as well as the melt indices of the resulting grafted PE, are summarized.

TABLE 3

| Exp. no. | throughput g/min | rpm | temp. °C. | S/MA/Ac ml/min | Ma wt. % | peroxide wt. % | Stabilizer Irganox 1076 wt. % | bonded MA wt. % | conversion % | MI g/10' |
| --- | --- | --- | --- | --- | --- | --- | --- | --- | --- | --- |
| 1 | 50 | 250 | 150 | | 5 | 0.1 | 0.05 | 2.0 | 40 | 5.1 |
| 2 | 50 | 150 | 150 | | 5 | 0.1 | 0.05 | 2.1 | 42 | 4.0 |
| 3 | 50 | 250 | 170 | | 5 | 0.1 | 0.05 | 5.0 | 100 | 4.4 |
| 4 | 50 | 150 | 170 | | 5 | 0.1 | 0.05 | 2.5 | 50 | 3.2 |
| 5 | 50 | 100 | 170 | | 5 | 0.1 | 0.05 | 2.5 | 50 | 4.4 |
| 6 | 50 | 250 | 170 | | 5 | 0.01 | 0.1 | 3.3 | 66 | 1.5 |
| 7 | 50 | 150 | 170 | | 5 | 0.1 | 0.1 | 2.7 | 54 | 2.6 |
| 8 | 48 | 250 | 150 | 5 | 4 | 0.05 | 0.05 | 3.7 | 92 | 3.6 |
| 9 | 48 | 250 | 150 | 6,5 | 5,4 | 0.05 | 0.05 | 5.5 | 100 | 3.0 |
| 10 | 48 | 250 | 150 | 7 | 6 | 0.075 | 0.05 | 5.6 | 93 | 2.6 |
| 11 | 48 | 250 | 150 | 6 | 5 | 0.075 | 0.05 | 4.8 | 96 | 2.7 |
| 12 | 48 | 250 | 170 | 6 | 5 | 0.075 | 0.05 | 4.9 | 100 | 2.7 |
| 13 | 48 | 250 | 150 | 6 | 5 | 0.025 | — | 4.7 | 100 | 3.9 |
| 14 | 48 | 250 | 150 | 7 | 6 | 0.025 | — | 6.1 | 100 | 3.6 |

EXAMPLE 4

In experiments 1-6 of this example LDPE (d=918 kg/m$^3$; MI=8 dg/min) and in experiments 7-9 VLDPE (d=900 kg/m$^3$; MI=2.2 dg/min) is applied; the twin-screw extruder used is the one mentioned in example 3, and the peroxide catalyst applied is Trigonox C ®.

The particulars of experiments 1-9 and the melt indices of the resulting graft polyethylene are shown in table 4 below.

EXAMPLE 6

A VLDPE (d=902 kg/m$^3$, MI=2.2 dg/min) is grafted in the same extruder as in example 3. In experiments 1-6 a 1:1 mixture of MA/aceton is used as grafting material, in experiments 7-12 a 1:1 mixture of styrene/aceton, and in experiments 13-18 a 2:2:1 mixture of styrene/MA/aceton.

In experiments 19-21 the MA-grafted products of experiments 1-3 are further grafted with a 1:1 mixture

TABLE 4

| Exp. no. | throughput g/min | rpm | temp. °C. | S/MA/Ac ml/min | Ma wt. % | peroxide wt. % | Stabilizer Irganox 1076 wt. % | bonded MA wt. % | conversion % | MI g/10' |
|---|---|---|---|---|---|---|---|---|---|---|
| 1 | 50  | 250 | 150 | 7  | 6.3 | 0.075 | 0.05 | 6.2 | 98  | 2.8 |
| 2 | 104 | 250 | 150 | 14 | 6.4 | 0.075 | 0.05 | 6.3 | 99  | 2.8 |
| 3 | 50  | 250 | 170 | 7  | 7.6 | 0.075 | 0.05 | 7.4 | 97  | 2.3 |
| 4 | 102 | 250 | 170 | 14 | 5.9 | 0.075 | 0.05 | 5.8 | 98  | 2.7 |
| 5 | 50  | 250 | 170 | 7  | 7.5 | 0.025 | —    | 7.1 | 95  | 3.0 |
| 6 | 52  | 250 | 150 | 7  | 6.8 | 0.025 | —    | 6.7 | 96  | 3.3 |
| 7 | 52  | 250 | 190 | 7  | 5.4 | 0.05  | 0.05 | 5.4 | 100 | 0.4 |
| 8 | 52  | 250 | 190 | 7  | 5.4 | 0.05  | 0.1  | 4.8 | 89  | 0.5 |
| 9 | 52  | 100 | 190 | 7  | 5.4 | 0.05  | 0.05 | 5.1 | 94  | 0.4 |

EXAMPLE 5

In this example a VLDPE (d=900 kg/m$^3$; MI=2.2 dg/min) is applied. The twin-screw extruder used is the one mentioned in example 3, and the process described there is applied also. The temperature of the extruder is 190° C. and the peroxide catalyst applied is Trigonox C ®.

The results are shown in table 5.

of styrene/aceton, and in experiments 22-24 the styrene-grafted products of experiments 7-9 are grafted with a 1:1 mixture of MA/aceton.

The peroxides used were either 0.05% (wt) Trigonox-C ® or 0.05% (wt) Luperox 130 ®, as indicated in table 4, and 0.05% (wt) Irganox 1076 ® was added as stabiliser. The temperature was kept at 190° C. and the screw speed was 250 rpm. The throughput was 67 g/min. The results are shown in table 6.

TABLE 5

| Exp. no. | throughput g/min | rpm | S/MA/Ac (2:2:1) ml/min | MA wt. % | peroxide wt. % | stabilizer, Irganox 1076 wt. % | bonded MA wt. % | conversion % | MI g/10' |
|---|---|---|---|---|---|---|---|---|---|
| 1 | 50  | 250 | 7  | 5.6 | —     | —     | 5.6 | 100 | 1.6 |
| 2 | 50  | 100 | 7  | 5.6 | —     | —     | 4.2 | 75  | 1.9 |
| 3 | 50  | 250 | 7  | 5.6 | 0.025 | —     | 5.1 | 91  | 0.7 |
| 4 | 50  | 100 | 7  | 5.6 | 0.025 | —     | 5.3 | 95  | 0.7 |
| 5 | 96  | 250 | 14 | 5.6 | 0.025 | —     | 5.6 | 100 | 0.4 |
| 6 | 50  | 250 | 7  | 5.6 | 0.025 | 0.013 | 4.6 | 82  | 0.6 |
| 7 | 100 | 250 | 14 | 5.6 | 0.025 | 0.013 | 5.7 | 100 | 0.4 |
| 8 | 100 | 250 | 14 | 5.6 | —     | —     | 4.5 | 80  | 1.7 |

TABLE 6

| Exp. no. | S/ac 1:1 | MA/ac 1:1 | S/MA/ac 2:2:1 ml/min | MA wt. % | bonded MA wt. % | conversion % | MI g/10 min. | peroxyde |
|---|---|---|---|---|---|---|---|---|
| 1  | —   | 2.5 | —  | 1.9 | 0.7 | 36 | 0.5 | T |
| 2  | —   | 5   | —  | 3.8 | 0.8 | 26 | 0.6 | T |
| 3  | —   | 7.5 | —  | 5.7 | 1.2 | 21 | 0.5 | T |
| 4  | —   | 2.5 | —  | 1.9 | 0.5 | 26 | 0.3 | L |
| 5  | —   | 5   | —  | 3.8 | 0.8 | 21 | 0.3 | L |
| 6  | —   | 7.5 | —  | 5.7 | 1.0 | 18 | 0.3 | L |
| 7  | 2.5 | —   | —  | —   | —   | —  | 1.2 | T |
| 8  | 5   | —   | —  | —   | —   | —  | 0.9 | T |
| 9  | 7.5 | —   | —  | —   | —   | —  | 1.1 | T |
| 10 | 2.5 | —   | —  | —   | —   | —  | 0.5 | L |
| 11 | 5   | —   | —  | —   | —   | —  | 0.5 | L |
| 12 | 7.5 | —   | —  | —   | —   | —  | 0.5 | L |
| 13 | —   | —   | 3  | 1.8 | 0.9 | 50 | 0.7 | T |
| 14 | —   | —   | 6  | 3.6 | 2.6 | 72 | 0.7 | T |
| 15 | —   | —   | 9  | 5.4 | 3.5 | 65 | 0.6 | T |
| 16 | —   | —   | 3  | 1.8 | 0.8 | 45 | 0.5 | L |
| 17 | —   | —   | 6  | 3.6 | 2.1 | 58 | 0.4 | L |
| 18 | —   | —   | 9  | 5.4 | 3.6 | 67 | 0.3 | L |
| 19 | 2.5 | —   | —  | —   | 0.6 | —  | 0.4 | T |
| 20 | 5   | —   | —  | —   | 0.8 | —  | 0.3 | T |
| 21 | 7.5 | —   | —  | —   | 1.1 | —  | 0.2 | T |
| 22 | —   | 2.5 | —  | 1.9 | 0.5 | 26 | 0.5 | T |
| 23 | —   | 5   | —  | 3.8 | 0.7 | 18 | 0.3 | T |

TABLE 6-continued

| Exp. no. | S/ac 1:1 | MA/ac ml/min 1:1 | S/MA/ac 2:2:1 | MA wt. % | bonded MA wt. % | conversion % | MI g/10 min. | peroxyde |
|---|---|---|---|---|---|---|---|---|
| 24 | — | 7.5 | — | 5.7 | 0.6 | 11 | 0.2 | T |

T = Trigonox C ®
L = Luperox 130 ®

The following examples 7 to 17 elucidate the use of the graft linear polyethylenes according to the invention for the modification of the impact strength of thermoplastic polymers.

Of the polyamides with modified impact strength the following properties will be determined:

grafted with S/MA according to example 2. The polyamide/graft PE mixing ratio is 80/20. The mixing took place in a twin-screw extruder at a temperature of 240° C. using polyamide 6, of 275° C. using polyamide 6,6 or of 310° C. using polyamide 4,6.

The properties of the modified polyamide can be derived from table 7 below.

TABLE 7

| Exp. no. | graft PE | PE bonded MA wt. % | MI g/10' | IZOD (KJ/m²) 23° C. | −30° C. | −40° C. | dimensional stability °C. | polyamide |
|---|---|---|---|---|---|---|---|---|
| 1 | LDPE | 3.0 | 3.5 | 118 | 13.1 | 12.8 | 57,8 | PA 6 |
| 2 | LDPE | 1.8 | 3.7 | 105 | 10.7 | 9.5 | 59.6 | PA 6 |
| 3 | VLDPE | 1.6 | 0.05 | 108 | 17.2 | 15 | 59.3 | PA 6 |
| 4 | VLDPE | 1.7 | 0.04 | 117 | 18.8 | 18.1 | 61.3 | PA 6 |
| 5 | LDPE | 3.0 | 3.5 | 11.2 | 8.1 | 6.6 | 71.8 | PA 6.6 |
| 6 | LDPE | 1.8 | 3.7 | 9.9 | 6.2 | 5.5 | 74.3 | PA 6.6 |
| 7 | VLDPE | 1.6 | 0.05 | 82.5 | 12.8 | 12.1 | 69.6 | PA 6.6 |
| 8 | VLDPE | 1.7 | 0.04 | 89 | 13.8 | 11.1 | 71.9 | PA 6.6 |
| 9 | LDPE | 3.0 | 3.5 | 76.1 | 11.3 | 12.1 | 84.9 | PA 4.6 |
| 10 | LDPE | 1.8 | 3.7 | 29 | 12.7 | 11.7 | 83.2 | PA 4.6 |
| 11 | VLDPE | 1.6 | 0.05 | 124 | 36.9 | 28.6 | 85.4 | PA 4.6 |
| 12 | VLDPE | 1.7 | 0.04 | 123 | 41.9 | 25.4 | 84.5 | PA 4.6 |

| | |
|---|---|
| Izod impact strength | (measured according to ISO 180) |
| E modulus | (measured according to ASTM-D-790) |
| dimensional stability | (measured according to ISO R 527-1) |
| maximum flexural strength | (measured according to ISO R 527-1) |
| breaking strength | (measured according to ASTM-D-790) |
| elongation | (measured according to ASTM-D-790) |

The object is to obtain the highest possible values of these properties.

EXAMPLE 7

This example shows the mixture with polyamide 6, polyamide 6,6 and polyamide 4,6 of, by way of comparison, LDPE (d=918 kg/m³; MI=8 dg/min) grafted with S/MA according to example 1 and of, by way of example, VLDPE (d=902 kg/m³; MI=2.2 dg/min)

EXAMPLE 8

In this example the conditions were the same as those mentioned in example 7, except for a variation of the polyamide 6/graft PE mixing ratios.

Further particulars can be derived from table 8.

TABLE 8

| Exp. no. | graft PE | PE bonded MA wt. % | MI g/10' | PA/PE | IZOD (KJ/m²) 23 ° C. | −30° C. | −40° C. | E-mod N/mm² |
|---|---|---|---|---|---|---|---|---|
| 1 | LDPE | 3.0 | 3.5 | 85/15 | 85.8 | 12.3 | 10.3 | 2500 |
| 2 | LDPE | 3.0 | 3.5 | 80/20 | 99.2 | 12.9 | 11.8 | 2360 |
| 3 | LDPE | 3.0 | 3.5 | 75/25 | 90.1 | 9.3 | 9.5 | 2190 |
| 4 | LDPE | 3.0 | 3.5 | 70/30 | 6.5 | 3.9 | 3.7 | 1650 |
| 5 | LDPE | 1.8 | 3.7 | 85/15 | 84.9 | 11.4 | 10.1 | 2500 |
| 6 | LDPE | 1.8 | 3.7 | 80/20 | 96.2 | 10.7 | 10.2 | 2380 |
| 7 | LDPE | 1.8 | 3.7 | 75/25 | 58.3 | 9.7 | 8.0 | 2190 |
| 8 | LDPE | 1.8 | 3.7 | 70/30 | 7.2 | 5.2 | 5.1 | 1770 |
| 9 | VLDPE | 1.6 | 0.05 | 85/15 | 69.9 | 14.2 | 12.6 | 2200 |
| 10 | VLDPE | 1.6 | 0.05 | 80/20 | 105 | 18.3 | 17.7 | 2050 |
| 11 | VLDPE | 1.6 | 0.05 | 75/25 | 125 | 26.8 | 20.9 | 1910 |
| 12 | VLDPE | 1.6 | 0.05 | 70/30 | 112 | 83.7 | 30.6 | 1740 |
| 13 | VLDPE | 1.7 | 0.04 | 85/15 | 80.3 | 17.2 | 14.2 | 2210 |
| 14 | VLDPE | 1.7 | 0.04 | 80/20 | 109 | 20.5 | 17.5 | 2015 |
| 15 | VLDPE | 1.7 | 0.04 | 75/25 | 123 | 56.6 | 26.0 | 1865 |
| 16 | VLDPE | 1.7 | 0.04 | 70/30 | 121 | 91.9 | 30.5 | 1700 |

EXAMPLE 9

In this example VLDPE (d=902 kg/m³; MI=2.2 dg/min) and VLDPE (d=900 kg/m³; MI=2.2 dg/min) grafted with S/MA according to example 2 are mixed with nylon 6 (PA 6) in the same way as in ex. 7.

The conditions, and the properties of the resulting products, are shown in table 9 below.

TABLE 9

| Exp. no. | graft PE kg/m³ | PE bonded MA wt. % | MI g/10' | PA/PE | IZOD (KJ/m²) 23° C. | IZOD (KJ/m²) −30° C. | IZOD (KJ/m²) −40° C. | E-mod N/mm² | maximum flexural strength N/mm² |
|---|---|---|---|---|---|---|---|---|---|
| 1  | —   | —   | —    | 100/0 | 5.4  | 4.2  | 4.1  | 2075 | 86.9 |
| 2  | 902 | 1.8 | 0.04 | 80/20 | 90.7 | 18.8 | 15.7 | 1900 | 77.6 |
| 3  | 902 | 1.8 | 0.04 | 60/40 | >100 | 19.3 | 16.5 | 1260 | 52.4 |
| 4  | 902 | 1.8 | 0.04 | 50/50 | 90   | 15.4 | 8.8  | 990  | 41.2 |
| 5  | 902 | 1.8 | 0.04 | 40/60 | 85   | 8.4  | 4.8  | 720  | 29.9 |
| 6  | 900 | 1.2 | 0.55 | 80/20 | 116  | 18.0 | 15.0 | 2020 | 81.8 |
| 7  | 900 | 1.2 | 0.55 | 70/30 | 122  | 20.1 | 15.8 | 1750 | 71.3 |
| 8  | 900 | 1.2 | 0.55 | 60/40 | 114  | 14.7 | 12.2 | 1330 | 54.2 |
| 9  | 900 | 1.2 | 0.55 | 50/50 | 110  | 17.0 | 14.3 | 980  | 408  |
| 10 | 900 | 1.2 | 0.55 | 40/60 | 95   | 22.7 | 16.0 | 780  | 32.1 |
| 11 | 900 | 1.5 | 0.50 | 80/20 | 122  | 17.4 | 13.8 | 2130 | 85.3 |
| 12 | 900 | 1.5 | 0.50 | 70/30 | 124  | 18.5 | 15.2 | 1789 | 73.0 |
| 13 | 900 | 1.5 | 0.50 | 60/40 | 107  | 13.5 | 11.1 | 1340 | 54.3 |
| 14 | 900 | 1.5 | 0.50 | 50/50 | 95   | 15.0 | 12.5 | 1000 | 40.4 |
| 15 | 900 | 1.5 | 0.50 | 40/60 | 80   | 20.9 | 15.5 | 750  | 31.3 |
| 16 | 900 | 0   | 2.2  | 80/20 | 20.6 | 7.5  | 7.2  | 2200 | 91.7 |

EXAMPLE 10

In this example VLDPE (d=900 kg/m³; MI=2.2 dg/min) grafted with S/MA according to example 2 is mixed with nylon 6,6 in the same way as in ex. 7.

The results are shown in table 10.

TABLE 10

| Exp. no. | graft PE | PE bonded MA wt. % | MI g/10' | PA/PE | IZOD (KJ/m²) 23° C. | IZOD (KJ/m²) −30° C. | IZOD (KJ/m²) −40° C. | E-mod N/mm² | maximum flexural strength N/mm² |
|---|---|---|---|---|---|---|---|---|---|
| 1  | —     | —   | —    | 100/0 | 4.6  | 4.2  | 3.9  | 2150 | 89.2 |
| 2  | VLDPE | 1.2 | 0.55 | 80/20 | 84.0 | 12.8 | 11.6 | 2140 | 89.5 |
| 3  | VLDPE | 1.2 | 0.55 | 70/30 | 103  | 17.1 | 12.8 | 1830 | 75.7 |
| 4  | VLDPE | 1.2 | 0.55 | 60/40 | 102  | 16.0 | 12.7 | 1410 | 59.8 |
| 5  | VLDPE | 1.2 | 0.55 | 50/50 | 85.3 | 16.5 | 13.8 | 990  | 41.9 |
| 6  | VLDPE | 1.2 | 0.55 | 40/60 | 68.4 | 16.2 | 12.3 | 600  | 25.6 |
| 7  | VLDPE | 1.5 | 0.50 | 80/20 | 79.3 | 14.9 | 12.2 | 2140 | 88.5 |
| 8  | VLDPE | 1.5 | 0.50 | 70/30 | 80.6 | 15.2 | 12.4 | 1855 | 76.5 |
| 9  | VLDPE | 1.5 | 0.50 | 60/40 | 72.1 | 13.4 | 11.3 | 1410 | 59.9 |
| 10 | VLDPE | 1.5 | 0.50 | 50/50 | 62.1 | 11.7 | 9.2  | 1010 | 41.6 |
| 11 | VLDPE | 1.5 | 0.40 | 40/60 | 64.2 | 14.7 | 11.1 | 630  | 27.4 |

EXAMPLE 11

In this example VLDPE (d=900 kg/m³; MI=2.2 dg/min) grafted with S/MA according to example 4 is mixed with nylon 6 in the same way as in ex. 7.

The conditions of the experiment, as well as the properties of the resulting products, are shown in table 11 below.

TABLE 11

| Exp. no. | bonded MA wt. % | MI g/10' | PA/PE | IZOD (KJ/m²) 23° C. | IZOD (KJ/m²) −30° C. | IZOD (KJ/m²) −40° C. |
|---|---|---|---|---|---|---|
| 1  | 4.5 | 1.0 | 80/20 | >>100  | 17.0 | 14.5 |
| 2  | 4.5 | 1.0 | 70/30 | >>100  | 16.9 | 13.8 |
| 3  | 4.5 | 1.0 | 60/40 | 109.7  | 14.9 | 11.5 |
| 4  | 4.5 | 1.0 | 50/50 | 87.1   | 12.8 | 10.5 |
| 5  | 4.5 | 1.0 | 40/60 | 74.8   | 14.2 | 8.9  |
| 6  | 4.9 | 0.9 | 80/20 | >>100  | 16.2 | 12.9 |
| 7  | 4.9 | 0.9 | 70/30 | >>100  | 17.2 | 12.6 |
| 8  | 4.9 | 0.9 | 60/40 | >>112.9| 13.9 | 10.3 |
| 9  | 4.9 | 0.9 | 50/50 | 93.3   | 12.7 | 10.9 |
| 10 | 4.9 | 0.9 | 40/60 | 77.5   | 13.3 | 11.6 |
| 11 | 5.8 | 0.8 | 80/20 | >>100  | 20.6 | 14.8 |
| 12 | 5.8 | 0.8 | 70/30 | >>100  | 18.6 | 13.5 |
| 13 | 5.8 | 0.8 | 60/40 | 98.6   | 17.7 | 12.1 |
| 14 | 5.8 | 0.8 | 50/50 | 98.1   | 14.0 | 11.3 |
| 15 | 5.8 | 0.8 | 40/60 | 84.6   | 18.5 | 14.7 |

EXAMPLE 12

In this example the graft-modified VLDPE (d=902 kg/m³; MI=2.2 dg/min) of example 6 are mixed with nylon 6 in a ratio of 80 PA/20 PE in the same way as described in example 7. The numbers of the experiments correspond to those of example 6.

The results are shown in table 12.

TABLE 12

| Exp. no. | bonded MA wt. % | IZOD (KJ/m²) 23° C. | IZOD (KJ/m²) 0° C. | IZOD (KJ/m²) −10° C. | IZOD (KJ/m²) −20° C. | IZOD (KJ/m²) −40° C. | E-mod. N/mm² | maximum flexural strength N/mm² |
|---|---|---|---|---|---|---|---|---|
| 1 | 0.7 | 49.4 | 46.6 | 34.7 | 14.3 |      | 1995 | 85.9 |
| 2 | 0.8 | 76.4 | 63.4 | 21.6 | 15.9 |      | 2029 | 84.1 |
| 3 | 1.2 | 81   | 64.9 | 21   | 13.8 |      | 2039 | 84.1 |
| 4 | 0.5 | 57.4 | 58.8 | 22.1 | 13.5 |      | 2025 | 84.0 |

TABLE 12-continued

| Exp. no. | bonded MA wt. % | IZOD (KJ/m$^2$) 23° C. | 0° C. | −10° C. | −20° C. | −40° C. | E-mod. N/mm$^2$ | maximum flexural strength N/mm$^2$ |
|---|---|---|---|---|---|---|---|---|
| 5 | 0.8 | 80.2 | 36.4 | 19.2 | 13.4 | | 1978 | |
| 6 | 1.0 | 22.2 | 14.8 | | | | 2042 | 83.1 |
| 7 | 0 | 6.2 | 4.2 | | | | 2036 | 81.5 |
| 8 | 0 | 5.3 | 5.1 | | | | 2105 | 84 |
| 9 | 0 | 5.8 | | | | | 1999 | 80.7 |
| 10 | 0 | 4.9 | | | | | 1987 | 78.8 |
| 11 | 0 | 5.3 | | | | | 1929 | 78.4 |
| 12 | 0 | 5.9 | | | | | 1958 | 79.8 |
| 13 | 0.9 | 111.3 | 93.1 | 25.6 | 21 | 17.9 | 2241 | 88.7 |
| 14 | 2.6 | 95.3 | 88.5 | 74.4 | 25.2 | 15.4 | 2066 | 81.9 |
| 15 | 3.5 | 109.5 | 87.2 | 23.7 | 19.4 | 16.1 | 2244 | 90.6 |
| 16 | 0.8 | 92.4 | 82.9 | 68.8 | 61.5 | 15.0 | 2050 | 83.3 |
| 17 | 2.1 | 113.1 | 100.4 | 83.5 | 26.3 | 16.7 | 2108 | 86.5 |
| 18 | 3.6 | 110.4 | 28.4 | 12.9 | 18.7 | | 2210 | 89.2 |
| 19 | 0.6 | 47.3 | 49.9 | 39.2 | 13.7 | | 2058 | 84.7 |
| 20 | 0.8 | 42.6 | 44 | 36.9 | 13.6 | | 2032 | 83.5 |
| 21 | 1.1 | 43.8 | 44.3 | 37.9 | 15.8 | | 2006 | 84.1 |
| 22 | 0.5 | 84 | 89 | 58.2 | 16.8 | | 1584 | 64.4 |
| 23 | 0.7 | 81.8 | 73.6 | 61.5 | 16.6 | | 1970 | 80 |
| 24 | 0.6 | 73.5 | 67.6 | 53.1 | 30.9 | 12.9 | 2026 | 82.8 |

EXAMPLE 13

This example shows the mixture with nylon 6 in the same way as in ex. 7 of, by way of comparison, LDPE (d=918 kg/m$^3$; MI=8 dg/min) and of, by way of example, VLDPE (d=900 kg/m$^3$; MI=2.2 dg/min) and mixtures with the LDPE, grafted respectively with S/MA according to examples 3 and 4.

The conditions of the experiment, as well as the properties of the modified nylons are shown in table 13 below.

EXAMPLE 14

This example shows the mixture with nylon 6.6 of, by way of comparison, LDPE (d=918 kg/m$^3$; MI=8 dg/min) and of, by way of example, VLDPE (d=900 kg/m$^3$; MI=2.2 dg/min) and mixtures with the LDPE, grafted respectively with S/MA according to examples 3 and 4.

The conditions of the experiment and the properties of the modified nylons are shown in table 12 below.

TABLE 13

| Exp. no. | graft PE | bonded MA wt. % | MI g/10' | PA/PE | IZOD (KJ/m$^2$) 23° C. | 0° C. | −10° C. | −30° C. | −40° C. |
|---|---|---|---|---|---|---|---|---|---|
| 1 | LDPE | 5.15 | 3.56 | 80/20 | >100 | 18.8 | 16.6 | 11.4 | 12.1 |
| 2 | LDPE | 5.15 | 3.56 | 70/30 | 59.9 | 8.8 | — | — | — |
| 3 | LDPE | 5.15 | 3.56 | 60/40 | — | — | — | — | — |
| 4 | LDPE | 5.15 | 3.56 | 50/50 | — | — | — | — | — |
| 5 | LDPE | 5.15 | 3.56 | 40/60 | — | — | — | — | — |
| 6 | VLDPE | 4.4 | 0.45 | 80/20 | >100 | >100 | 89.6 | — | 25.3 |
| 7 | VLDPE | 4.4 | 0.45 | 70/30 | >100 | >100 | >100 | — | 27.9 |
| 8 | VLDPE | 4.4 | 0.45 | 60/40 | >100 | >100 | 98.3 | 23.3 | 21.6 |
| 9 | VLDPE | 4.4 | 0.45 | 50/50 | 93.9 | 85.8 | 93.5 | 21.8 | 18 |
| 10 | VLDPE | 4.4 | 0.45 | 40/60 | 73.6 | 75.2 | 82.8 | 85.3 | 29.6 |
| 11 | LDPE/VLDPE | 5.5/4.4 | 3.56/4.4 | 80/13.3/6.7 | >100 | 94.3 | 72.9 | 22.9 | 15.9 |
| 12 | LDPE/VLDPE | 5.5/4.4 | 3.56/4.4 | 80/10/10 | >100 | 94.4 | 79.2 | 21.9 | 14.9 |
| 13 | LDPE/VLDPE | 5.5/4.4 | 3.56/4.4 | 80/6.7/13.3 | >100 | 99.7 | 87.6 | 26.7 | 16.1 |

| Exp. no. | dimensional stability °C. | E-mod N/mm$^2$ | maximum flexural strength N/mm$^2$ | breaking strength (drawing test) N/mm$^2$ | elongation (drawing test) % |
|---|---|---|---|---|---|
| 1 | 65.2 | 2280 | 91.7 | 50.5 | 46 |
| 2 | 68.1 | 1890 | 76.7 | 27.8 | 9 |
| 3 | — | — | — | — | — |
| 4 | — | — | — | 20.5 | 6 |
| 5 | — | — | — | 15.4 | 9 |
| 6 | 61.1 | 2150 | 86.2 | 57.5 | 86 |
| 7 | 61.8 | 1880 | 74.5 | 65.4 | 151 |
| 8 | 59.8 | 1440 | 57.7 | 54.2 | 217 |
| 9 | 62.0 | 1060 | 42.7 | 45.7 | 188 |
| 10 | 59.4 | 730 | 30 | 35.2 | 182 |
| 11 | 65.8 | 2240 | 89.9 | 55.4 | 43 |
| 12 | 60.7 | 2260 | 90.1 | 57.3 | 72 |
| 13 | 62.3 | 2210 | 87.1 | 55.6 | 60 |

TABLE 14

| Exp. no. | graft PE | bonded MA wt. % | MI g/10' | PA/PE | IZOD (KJ/m²) | | | | |
|---|---|---|---|---|---|---|---|---|---|
| | | | | | 23° C. | 0° C. | −10° C. | −30° C. | −40° C. |
| 1 | LDPE | 5.15 | 3.56 | 80/20 | >100 | 18.8 | 16.6 | 11.4 | 12.1 |
| 2 | LDPE | 5.15 | 3.56 | 70/30 | 59.9 | 8.8 | — | — | — |
| 3 | LDPE | 5.15 | 3.56 | 60/40 | — | — | — | — | — |
| 4 | LDPE | 5.15 | 3.56 | 50/50 | — | — | — | — | — |
| 5 | LDPE | 5.15 | 3.56 | 40/60 | — | — | — | — | — |
| 6 | VLDPE | 4.4 | 0.45 | 80/20 | >100 | >100 | 89.6 | — | 25.3 |
| 7 | VLDPE | 4.4 | 0.45 | 70/30 | >100 | >100 | >100 | — | 27.9 |
| 8 | VLDPE | 4.4 | 0.45 | 60/40 | >100 | >100 | 98.3 | 23.3 | 21.6 |
| 9 | VLDPE | 4.4 | 0.45 | 50/50 | 93.9 | 85.8 | 93.5 | 21.8 | 18 |
| 10 | VLDPE | 4.4 | 0.45 | 40/60 | 73.6 | 75.2 | 82.8 | 85.3 | 29.6 |
| 11 | LDPE/ VLDPE | 5.5/ 4.4 | 3.56/ 4.4 | 80/ 13.3/6.7 | >100 | 94.3 | 72.9 | 22.9 | 15.9 |
| 12 | LDPE/ VLDPE | 5.5/ 4.4 | 3.56/ 4.4 | 80/ 10/10 | >100 | 94.4 | 79.2 | 21.9 | 14.9 |
| 13 | LDPE/ VLDPE | 5.5/ 4.4 | 3.56 4.4 | 80/ 6.7/13.3 | >100 | 99.7 | 87.6 | 26.7 | 16.1 |

| Exp. no. | dimensional stability °C. | E-mod N/mm² | maximum flexural strength N/mm² | breaking strength (drawing test) N/mm² | elongation (drawing test) % |
|---|---|---|---|---|---|
| 1 | 65.2 | 2280 | 91.7 | 50.5 | 46 |
| 2 | 68.1 | 1890 | 76.7 | 27.8 | 9 |
| 3 | — | — | — | — | — |
| 4 | — | — | — | 20.5 | 6 |
| 5 | — | — | — | 15.4 | 9 |
| 6 | 61.1 | 2150 | 86.2 | 57.5 | 86 |
| 7 | 61.8 | 1880 | 74.5 | 65.4 | 151 |
| 8 | 59.8 | 1440 | 57.7 | 54.2 | 217 |
| 9 | 62.0 | 1060 | 42.7 | 45.7 | 188 |
| 10 | 59.4 | 730 | 30 | 35.2 | 182 |
| 11 | 65.8 | 2240 | 89.9 | 55.4 | 43 |
| 12 | 60.7 | 2260 | 90.1 | 57.3 | 72 |
| 13 | 62.3 | 2210 | 87.1 | 55.6 | 60 |

EXAMPLE 15

This example shows the mixture with nylon 4,6 in the same way as in ex. 7 of, by way of comparison, LDPE (d=918 kg/m³; MI=8 dg/min) and of, by way of example, VLDPE (d=902 kg/m³; MI=2.2 dg/min) and mixtures with the LDPE, grafted respectively with S/MA according to examples 3 and 4.

The conditions of the experiment and the properties of the modified nylons are shown in table 15 below.

TABLE 15

| Exp. no. | graft PE | bonded MA wt. % | MI g/10' | PA/PE | IZOD (KJ/m²) | | | | |
|---|---|---|---|---|---|---|---|---|---|
| | | | | | 23° C. | 0° C. | −10° C. | −30° C. | −40° C. |
| 1 | LDPE | 5.15 | 3.56 | 80/20 | 19.8 | 15.3 | 13 | 9.6 | 9.1 |
| 2 | LDPE | 5.15 | 3.56 | 75/25 | 19.0 | 14.2 | 10.8 | 9.4 | 8.3 |
| 3 | LDPE | 5.15 | 3.56 | 70/30 | 13.7 | 11.7 | 9.6 | 7.8 | — |
| 4 | VLDPE | 4.4 | 0.45 | 80/20 | >100 | 94 | 90.1 | 34.7 | 25.6 |
| 5 | VLDPE | 4.4 | 0.45 | 75/25 | 93.5 | 85.9 | 84.4 | 36.1 | 29.2 |
| 6 | VLDPE | 4.4 | 0.45 | 70/30 | 93.4 | 88.7 | 81.5 | 35.7 | 29.4 |
| 7 | LDPE/ VLDPE | 5.15/ 4.4 | 3.56/ 0.45 | 80/ 13.3/6.7 | 24.3 | 19.7 | 15.9 | 12.6 | 12.7 |
| 8 | LDPE/ VLDPE | 5.15/ 4.4 | 3.56/ 0.45 | 80/ 10/10 | 73.8 | 31.7 | 28.8 | 17.5 | 17.7 |
| 9 | LDPE/ VLDPE | 5.15/ 4.4 | 3.56/ 0.45 | 80/ 6.7/13.3 | 75.1 | 34.3 | 29 | 25 | 16.3 |

| Exp. no. | dimensional stability °C. | E-mod N/mm² | maximum flexural strength N/mm² | breaking strength (drawing test) N/mm² | elongation (drawing test) % |
|---|---|---|---|---|---|
| 1 | 84.6 | 2200 | 94.5 | 7.5 | 33 |
| 2 | 85.3 | 2030 | 86.8 | 71.8 | 35 |
| 3 | 86.3 | 1880 | 80.0 | 63.4 | 20 |
| 4 | 86.3 | 2070 | 91.1 | 71.6 | 42 |
| 5 | 86.9 | 1790 | 77.9 | 65.3 | 44 |
| 6 | 87.1 | 1820 | 79.1 | 65 | 41 |
| 7 | 89.7 | 2200 | 97.7 | 72 | 30 |
| 8 | 89.0 | 2050 | 90.6 | 70.7 | 36 |
| 9 | 89.0 | 2050 | 90.2 | 70.4 | 36 |

BRIEF DESCRIPTION OF DRAWINGS

EXAMPLE 16

FIG. 1 and FIG. 2

Figure 1:
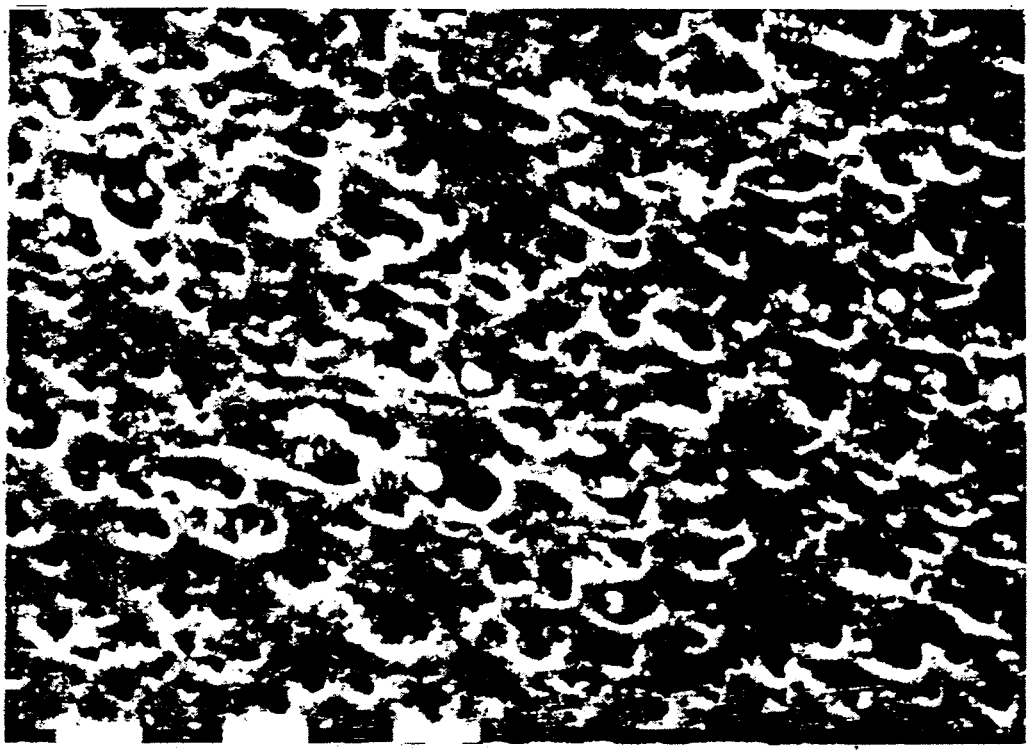
Figure 2:
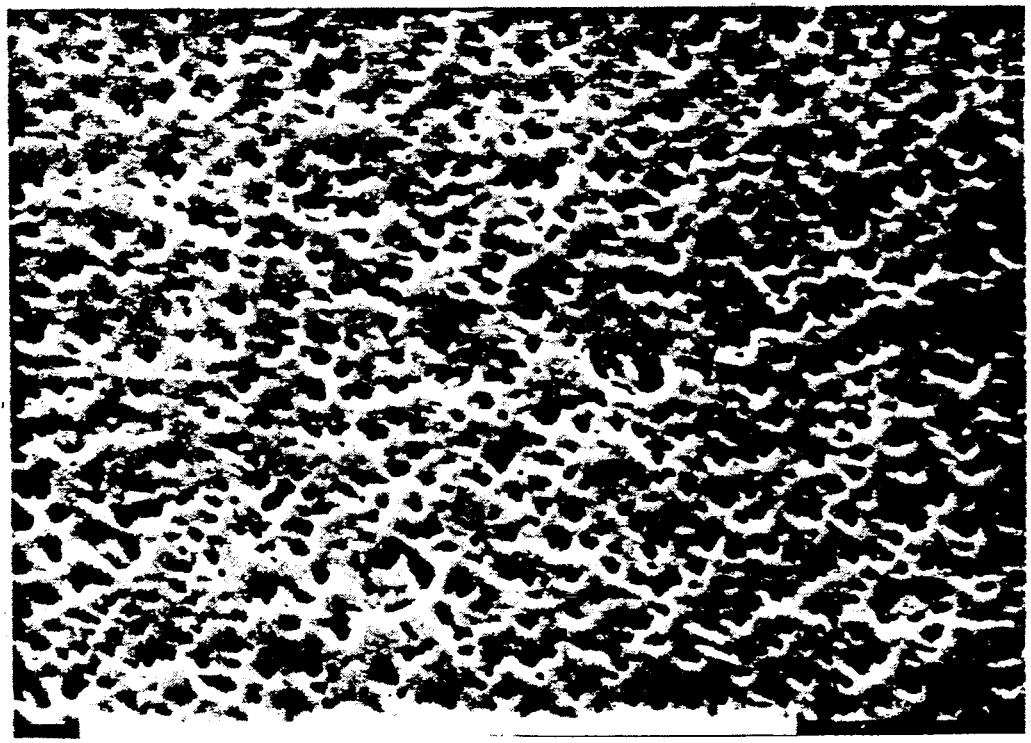

This example consists of pictures of the mixtures according to example 8, experiment no. 2 (for comparison), FIG. 1, magnified 8500 times, and example 8, experiment no. 10 (for example), FIG. 2, magnified 6800 times. For the purpose of these pictures the S/MA-LDPE-PA mixture and the S/MA-VLDPE-PA mixture have been etched with oxygen plasma. These pictures clearly show that the grafted LDPE particles (up to 0.6 μm) are larger than the grafted VLDPE particles (up to 0.07 μm).

EXAMPLE 17

In this example commercially available impact modifiers are mixed, by way of comparison, and VLDPE (d=902 kg/m$^3$; MI=2.2 dg/min) grafted with S/MA according to example 4 is mixed, by way of example, with polyethyleneterephthalate (Arnite A104–900). Table 16.

TABLE 16

| Exp. | impact | PET/mod. | IZOD 23° C. |
|---|---|---|---|
| 1 | — | 100/0 | 4 |
| 2 | Polybond 1016 ® | 80/20 | 5.5 |
| 3 | Polybond 1016 ® | 70/30 | 5.2 |
| 4 | Hytrel 4056 ® | 80/20 | 6.8 |
| 5 | Hytrel 4056 ® | 70/30 | 8.3 |
| 6 | Paraloid 334 ® | 80/20 | 9.2 |
| 7 | Paraloid 334 ® | 70/30 | 8.9 |
| 8 | SMA-VLDPE | 80/20 | 10.7 |
| 9 | SMA-VLDPE | 70/30 | 11.9 |

I claim:

1. Process for preparing graft-modified linear polyethylene having a density lower than 940 kg/m$^3$ comprising the steps of:

reacting polyethylene with at least one ethylenically unsaturated carboxyl-group containing compound and at least one vinylaromatic compound, the molar ratio of the vinylaromatic compound(s) to the carboxyl group containing compound(s) being from 2:1 to 1:2 in the presence of a polar solvent in a weight ratio of 2:1 to 1:10 calculated on the total graft material, at a temperature higher than 110° C. under the influence of shearing forces.

2. The process of claim 1 wherein the polyethylene is reacted in the presence of an antioxidant.

3. Process according to claim 1, characterized in that the vinylaromatic compound(s) is/are grafted onto the polyethylene before or together with the carboxyl group containing compound(s).

4. Process according to claim 1, characterized in that the vinylaromatic compound(s) is/are grafted onto the polyethylene together with the carboxyl group containing compound(s).

5. The process of claim 1 wherein the polyethylene is reacted in the presence of a radical initiator.

6. The process of claim 5, wherein the polyethylene is reacted in the presence of an anti-oxidant.

* * * * *